United States Patent [19]

Meierovich et al.

[11] 4,237,507
[45] Dec. 2, 1980

[54] SUPERCONDUCTING MAGNETIC SYSTEM

[75] Inventors: Eduard A. Meierovich; Pavel B. Shenderovich; Jury I. Chalisov; Valery A. Golenchenko; Igor V. Rybin; Vitaly B. Sukhushin, all of Moscow, U.S.S.R.

[73] Assignee: Gosudarstvenny Nauchnoissledovatelsky Energetichesky Institut Imeni G. M. Krzhizhanovskogo, Moscow, U.S.S.R.

[21] Appl. No.: 923,683

[22] Filed: Jul. 11, 1978

[51] Int. Cl.² .............................................. H02H 3/08
[52] U.S. Cl. ...................................... 361/19; 335/216
[58] Field of Search .......................... 335/216; 361/19; 174/126 S, 128 S

[56] References Cited

U.S. PATENT DOCUMENTS

| 3,363,207 | 1/1968 | Brechna | 335/216 |
| 3,474,294 | 10/1969 | Weaver, Jr. et al. | 361/19 |
| 3,691,491 | 9/1972 | Massar et al. | 361/19 |
| 3,768,053 | 10/1973 | Massar | 335/216 |

FOREIGN PATENT DOCUMENTS

| 2026570 | 9/1970 | France | 335/216 |
| 2181218 | 11/1973 | France | 335/216 |

Primary Examiner—George Harris
Attorney, Agent, or Firm—Fleit & Jacobson

[57] ABSTRACT

The superconducting magnetic system comprises a superconducting sectionalized coil. Each section of the coil has a series-connected disconnector with a controlled shunt of superconducting material and normal zone detection unit connected in parallel to the coil section and its disconnector. Said coil is linked inductively with an energy removal device. The latter comprises a heat-insulated compartment cooled to cryogenic temperature. The compartment contains the disconnectors and at least one coil of normal metal and a jumper of superconducting material making up a closed electric circuit. Each controlled shunt and jumper is fitted with a control winding. The control windings of the shunts are linked electrically with the respective normal zone detection unit. The control winding of the jumper is linked electrically with each normal zone detection unit.

8 Claims, 5 Drawing Figures

U.S. Patent  Dec. 2, 1980  Sheet 2 of 3  4,237,507

SUPERCONDUCTING MAGNETIC SYSTEM

FIELD OF APPLICATION

This invention relates to magnetic systems and more particularly to superconducting magnetic systems.

The invention can be used to advantage in various branches of industry and research work, say, for a magnetic suspension of transport vehicles, inductive energy storage and confinement of plasma by a magnetic field in nuclear research installations.

BACKGROUND OF THE INVENTION

In general, the main components of existing superconducting magnetic systems are a cryostat, a system of cooling, a sectionalized superconducting coil and an energy output device providing for protection of the magnetic system in the event that normal zones should arise within the superconductor of the coil sections. The shape, dimensions and mutual arrangement of the coil sections depend on the purpose of the magnetic system. As magnetic systems employing superconductors are rather expensive installations, it is essential to prevent at interruptions in superconductivity occuring at the appearance of normal zones within the superconductor of the coil sections.

In the early stages of development of superconducting magnetic systems when the principles of stabilization of the superconductor, the technology of its manufacture and the principles underlying the design of the cryostat and the system of cooling were still rudimental, the main efforts of designers were directed to preventing the occurence of fluctuating normal zones (i.e., interruptions in superconductivity).

Thus, the layers of the superconducting coil of some superconducting magnetic systems (see, for instance, U.S. Pat. No. 3,363,207, 1968,) are kept at a certain distance from one another by supporting elements consisting of shields made of conducting material having a low electrical resistance. The shields form short-circuited loops, and both surfaces of each shield are covered with a layer of porous insulating material. The shields are provided with ducts for the flow of the cooling agent.

Such an embodiment of the superconducting magnetic system improves the stability of its operation by the introduction of electromagnetic stability (due to the short-circuited loops) and improvement of cryostatic stabilization (as the ducts increase the area of the cooling surface).

To improve the stability of operation by eliminating the sharp changes in magnetic flux, some superconducting magnetic systems [(see, for example, French Pat. No. 2,027,395, 1970,] have iron inserts producing intense magnetization arranged at sections where the components of the magnetic flux are at right angles to the superconducting surface of the strips forming the coil.

In other superconducting magnetic systems [(see, for instance, French Pat. No. 2026570, 1970,] comprising a cryostat, system of cooling and superconducting coil, the coil is cooled by forced circulation of the cooling agent, thus improving the cryostatic stabilization of the coil superconductor by raising the heat-exchange coefficient.

Known in the art are also superconducting magnetic systems employing all kinds of band elements to prevent degradation of superconductivity and lessen the probability of appearance of normal zones.

Therefore, in the course of development of the design features of superconducting magnetic systems, the appearance of normal zones within the superconductor was treated as an irreversible phenomenon making it necessary to stop the operation of the system. That stoppage is known to be accompanied by the withdrawal of the energy stored in the magnetic field of the system. In this case, the problem is that of removing the energy without causing any damage to the superconducting magnetic system. The problem is solved by resorting to various embodiments of the superconducting magnetic systems. A known superconducting magnetic system of this type (see, for example, French Pat. No. 2181218, 1974, Cl. is fitted with a protective device coil of superconducting material linked inductively with the superconducting coil of the magnetic system. At the occurence of a normal zone within the superconducting coil of the magnetic system, the coil of the protective device becomes energized and its magnetic field transfers the superconducting coil of the magnetic system into its normal (nonsuperconducting) state. This allows avoidance of an inadmissible temperature rise of the superconductor of the magnetic system at the point of initial formation of the normal zone.

Most versions of this type of solution of the problem are, however, aimed at passing the energy stored in the superconducting magnetic system over to the surrounding medium ($T \approx 300K$). The energy may be passed over to the electric power supply mains, say, with the aid of an inverter, or dissipated as thermal energy in an external emergency shunt made, for instance, as a cooled resistor.

Known also is a superconducting magnetic system (see, for instance, Japanese Pat. No. 45-14999, 1970,) wherein the sections of the superconducting coil are connected in series with the source of supply under normal duty conditions of the system and in parallel with an external emergency shunt (with the source of supply disconnected) at the appearance of a normal zone within the superconductor of any of the coil sections.

A much simpler solution of the problem is achieved in superconducting magnetic systems [(see, for example, FRG Pat. No. 1439487, 1973)], wherein the sections of the superconducting coil are shunted with normal metal of a resistivity higher than that of the stabilizing base layer of the superconductor. The magnetic system is also provided with an energy removal device comprising an external emergency shunt and disconnector of the supply source of the superconducting magnetic system. The energy removal device operates on receiving a signal from the normal zone detection unit. Such an arrangement ensures simultaneous energy removal and shunting of the superconductor in the process of removal, thus lowering the temperature of the superconductor.

None of the above versions provide for continuation of operation of the superconducting magnetic system after the occurence of a normal zone within the superconductor, though there is a great demand for such systems.

For example, it is essential to provide for continuous operation of the superconducting magnetic system and maintain its output at set level in cases where the magnetic system is a component of larger devices, say, devices wherein plasma is to be confined by the magnetic field.

Known is a superconducting magnetic system comprising a superconducting sectionalized coil, each section of which has a series-connected disconnector, a controlled shunt of superconducting material and a normal zone detection unit connected in parallel with the section and its disconnector and is coupled inductively with an energy removal device [see, for instance, USSR Inventor's Certificate No. 570283, 1975,].

The incorporation of a series-connected disconnector and parallel shunt of superconducting material in every section of the coil of the above-mentioned superconducting magnetic system allows to disconnect the section where the normal zone has appeared, maintain the electrical link between the remaining sections and the source of supply and localize the point of excessive temperature rise of the disconnected section.

The energy removal device of the system has a magnetic circuit ensuring a high coefficient of magnetic coupling of the energy removal device with any of the coil sections and, at the same time, allowing to control the shunts of superconducting material arranged within the gaps of the magnetic circuit branches. The employment of a magnetic circuit in the energy removal device limits, however, the field of application of such a superconducting magnetic system since the saturation of the magnetic circuit (occuring for most conventional ferromagnetic materials at a magnetic field density of 2T) worsens the magnetic coupling of the section with the energy removal device that—in addition to the magnetic circuit—has a superconducting protective coil, current leads and an external emergency shunt and disconnector. There are ferromagnetic materials saturating at cryogenic temperatures of 4T. They are, however, difficult to manufacture and, moreover, the density of the fluxes set up by superconducting magnetic systems is in most cases up to and above 6T. The superconducting protective coil is arranged—just as the sections of the superconducting coil of the magnetic system—on the above-mentioned magnetic circuit and connected by current-carrying leads in series with the external emergency shunt via a disconnector.

Under normal duty conditions of the superconducting magnetic system, the circuit of the protective coil is open.

At the occurence of a normal zone within any of the sections of the superconducting coil, the circuit of the section in question is opened and that of the protective coil is closed. The energy associated with the disconnected section is transferred with the aid of the protective coil to the energy removal device, dissipated in the external emergency shunt and—to a certain extent—in the disconnector of the given section. The dissipation of energy within the disconnector is accompanied by intensive evaporation of the cooling agent in the cryostat of the superconducting magnetic system. The same cooling agent serves for normal functioning of the sectionalized superconducting coil. The worsening of magnetic coupling is accompanied by excessive release of heat within the disconnector of the disconnected section and, consequently, is liable to cause an inadmissible rise in the pressure of the cooling agent, causing its ejection and may interrupt the operation of the superconducting magnetic system. The saturation of the magnetic circuit also leads to a drop in the field strength within the gaps of the magnetic circuit branches and untimely opening (superconductivity) of the shunts of superconducting material. At fluctuations of the magnetic field, this is liable to cause the transfer of a certain quantity of the energy over to the source of supply or—when using a superconducting element short-circuiting the superconducting sectionalized coil—to an unforeseen rise in the current of the superconducting sectionalized coil.

Besides, the current-carrying leads of the energy removal device may cause the transfer of the protective coil over to normal state, an event that also contributes to excessive dissipation of heat within the disconnector on disconnection of the section and, consequently, raising the pressure of the cooling agent and causing its ejection.

SUMMARY OF THE INVENTION

The object of the present invention is to improve the service reliability of the superconducting magnetic system by a specific embodiment of the energy removal device, selection of the material of its components and their mutual arrangement.

It is another object of the invention to improve the reliability of protection of the superconducting magnetic system irrespective of the strength of its magnetic field.

These and other objects of the present invention are accomplished by the development of a superconducting magnetic system comprising a superconducting sectionalized coil, each section of which has a series-connected disconnector, a controlled shunt of superconducting material connected in parallel to the section and the disconnector, and a normal zone detection unit, each said section being coupled inductively with an energy removal device provided, according to the present invention, with a heat-insulated compartment cooled to cryogenic temperature and containing at least one coil of normal metal with a jumper of superconducting material making up a closed electric circuit. The disconnectors are arranged in the heat-insulated compartment cooled to cryogenic temperature, each controlled shunt and jumper having a control winding coupled electrically in the case of the shunt with its respective normal zone detection unit, and in the case of the jumper—with each normal zone detection unit of the superconducting magnetic system.

It is of advantage to arrange the heat-insulated compartment cooled to cryogenic temperatures so that it embraces the superconducting sectionalized coil.

It is desirable to arrange the heat-insulated compartment cooled to cryogenic temperature inside the superconducting sectionalized coil with a 2nd-order superconductor serving as the superconducting material of the jumper.

It is reasonable to couple the control windings electrically with the normal zone detection unit via a programmed control device.

The arrangement of all the superconducting magnetic system elements used for thermal dissipation of the magnetic energy inside a single heat-insulated compartment cooled to cryogenic temperature makes it possible—in accordance with the present invention—to prevent any changes liable to occur in the cooling conditions of the superconducting magnetic system.

The provision of a closed electric circuit made up of a coil of normal metal and a jumper of superconducting material isolated from the environment lessens—in accordance with the present invention—the probability of failure of the energy removal device and, consequently, of the entire superconducting magnetic system.

The presence of the control windings of the shunts of superconducting material and jumpers coupled electrically with the normal zone detection units provides for a wider selection of the materials of the shunts and jumpers and the methods of their control (thermal, magnetic). Moreover, it becomes possible to provide for a proper sequence of connection of individual elements of the patented superconducting magnetic system.

The proposed versions of arrangement of the heat-insulated compartment cooled to cryogenic temperature in respect to the superconducting sectionalized coil allow to select an optimum temperature of cooling of said compartment.

BRIEF DESCRIPTION OF ACCOMPANYING DRAWINGS

The above and other objects, features and advantages of the present invention will be more fully understood from the following description considered in connection with the accompanying drawings, wherein.

DETAILED DESCRIPTION OF THE INVENTION

Figure 1:
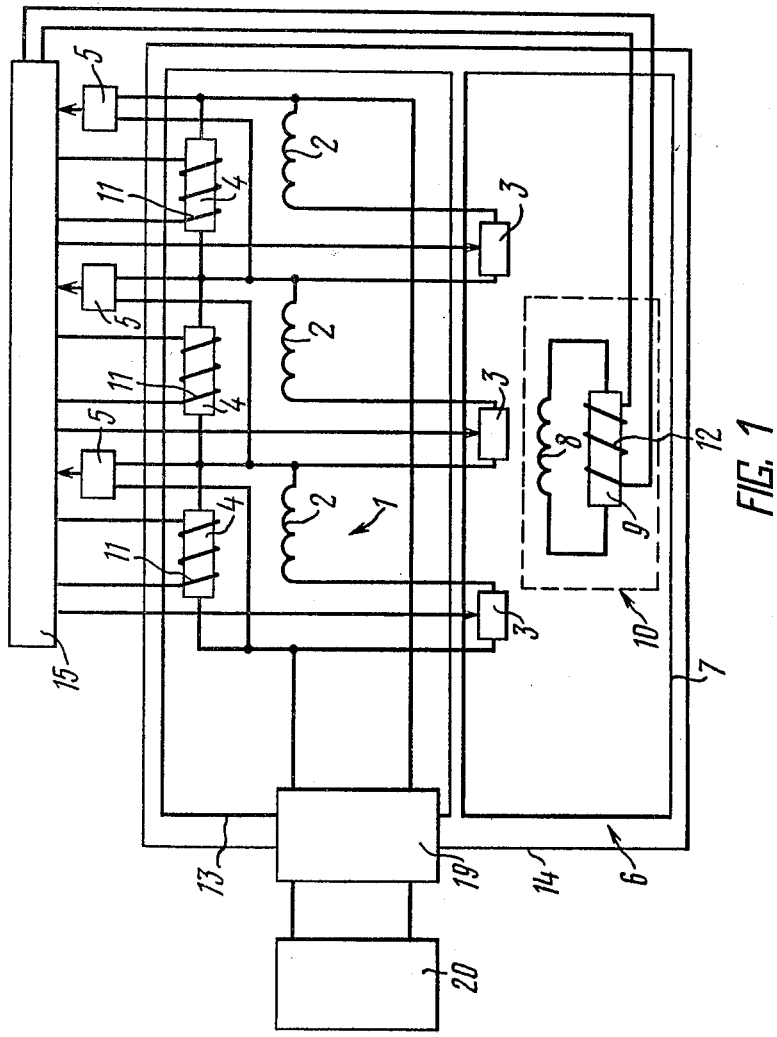
FIG. 1 shows the elementary circuit diagram of the superconducting magnetic system, in accordance with the present invention.

The hereinproposed superconducting magnetic system comprises a superconducting sectionalized coil 1 (FIG. 1) each section 2 of which has a series-connected disconnector 3 and a controlled shunt 4 of superconducting material and a normal zone detection unit 5 connected in parallel to section 2 and the disconnector 3, said coil 1 being inductively coupled with an energy removal device 6.

The energy removal device 6 comprises a heat-insulated compartment 7 cooled to cryogenic temperature that contains a coil 8 of normal metal with a jumper 9 of superconducting material making up a closed electric circuit 10. The compartment 7 also contains the disconnectors 3.

The controlled shunt 4 and jumper 9 are fitted with control windings 11 and 12, respectively, the winding 11 of each shunt 4 being coupled electrically with its respective normal zone detection unit 5, and the winding 12 of the jumper 9-with each of the normal zone detection units 5.

The superconducting sectionalized coil 1 is placed in a cooled compartment 13 that is arranged together with the cooled compartment 7 inside a cryostat 14.

Figure 2:
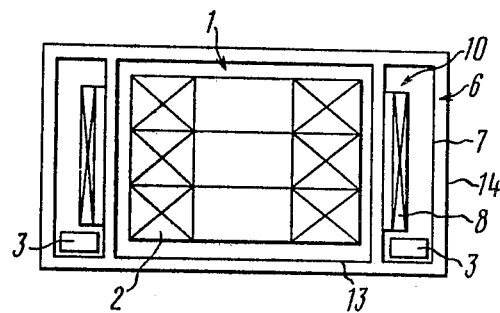
FIG. 2 shows the general arrangement of the energy removal device and the superconducting sectionalized coil of the superconducting magnetic system of FIG. 1.
Figure 3:
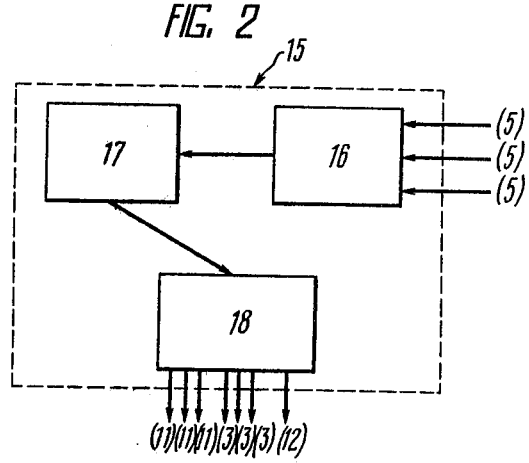
FIG. 3 shows the functional diagram of the programmed control device of the superconducting magnetic system of FIG. 1.

In this embodiment of the superconducting magnetic system, the heat-insulated compartment 7 (FIG. 2) cooled to cryogenic temperature is arranged—in accordance with the present invention—so as to embrace the cooled compartment 13 containing the superconducting sectionalized coil 1. The control windings 11 and 12 (FIG. 1) are coupled electrically with the normal zone detection units 5 via a programmed control device 15. The latter comprises a logic unit 16 (FIG. 3) with its inputs connected to the outputs of the normal zone detection units 5. The output of the logic unit 16 is connected to the input of the signal shaping unit 17, the output of which is connected to the time delay unit 18 with outputs connected to the control windings 11 and 12 and the disconnectors 3.

The superconducting sectionalized coil 1 (FIG. 1) is connected by current-carrying leads 19 to the source of supply 20. The current-carrying leads 19 are installed in the cryostat 14 and the cooled compartment 13.

The above-described version of embodiment of the superconducting magnetic system provides for a single coil 8 of normal metal and jumper 9 of superconducting material making up, correspondingly, a single closed electric circuit 10. The superconducting magnetic system may, however, employ several coils and jumpers forming, correspondingly, several closed electric circuits. The number of coils 8 is selected in this case according to the set level of service reliability of the superconducting magnetic system, the number of sections 2 of the coil 1 and the permissible number of failures (number of disconnected coil sections).

Therefore, provision is made in this embodiment of the superconducting magnetic system wherein the heat-insulated compartment 21 cooled to cryogenic temperature (FIG. 4) of the energy removal device 6 contains two coils 22 of normal metal and jumpers 23 of superconducting material making up two closed electric circuits 10. The heat-insulated compartment 21 cooled to cryogenic temperature is arranged inside the superconducting sectionalized coil 1 contained in a cooled compartment 24 placed inside the cryostat 25. In this case, a 2nd-order superconductor serves as the superconducting material of each jumper 23.

Figure 5:
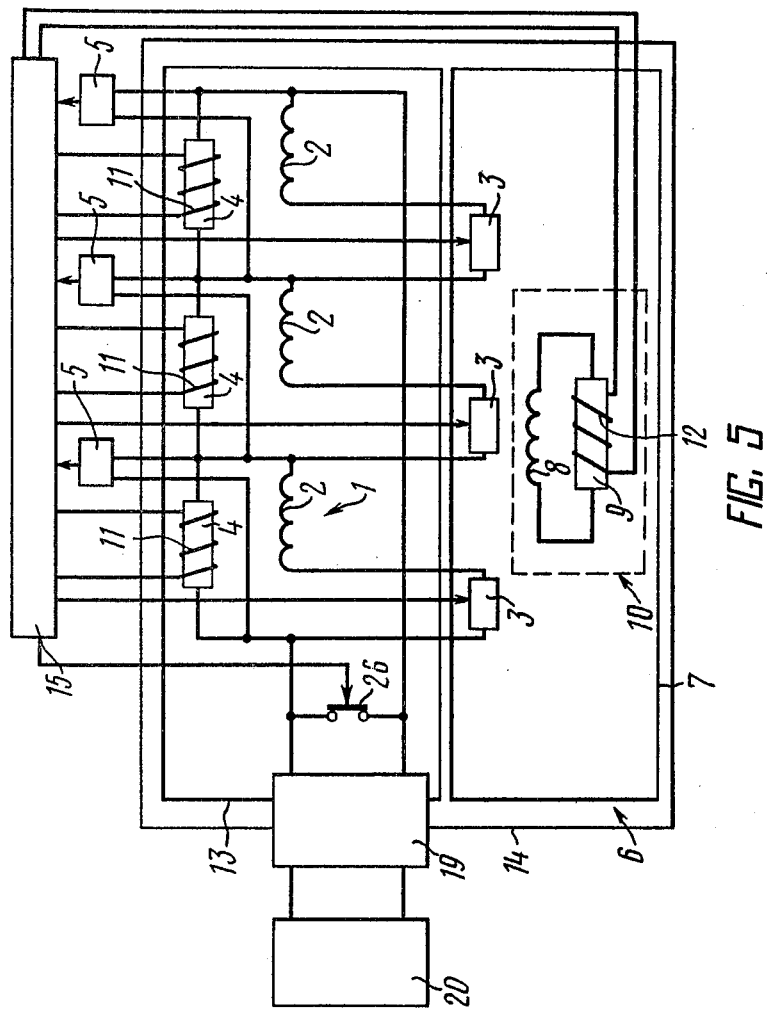
FIG. 5 shows another version of the elementary circuit diagram of the superconducting magnetic system, in accordance with the present invention.

The version of embodiment of the superconducting magnetic system shown in FIG. 5 includes a contact key 26 (a superconducting element short-circuiting the coil 1) connected in parallel with the source of supply 20 and the superconducting sectionalized coil 1 and, also, to the output of the programmed control device 15. Such an arrangement allows—in joint with the energy removal device 6—to avoid the dissipation of energy in the source of supply 20 when a section 2 of the coil 1 is disconnected.

The number of sections of the superconducting sectionalized coil depends in the above-described versions of embodiment of the superconducting magnetic system on the permissible range of variation of its output parameters (magnetic field density, stored energy) at the occurence of the set number of failures of the superconducting magnetic system.

The temperature of cooling of the compartment of the energy removal device may be within an ample range and is determined solely by the necessity of keeping the jumper in a state of superconductivity throughout the period of dissipation of energy in the closed electric circuit. The disconnectors may functionally either fully open the electric circuit or introduce a certain resistance into the circuit. It is of advantage to arrange the controlled shunts within the region of weak magnetic fields of the system. The action produced on the shunts and jumper may be of a thermal or magnetic nature depending on the specific conditions of application of the system.

In accordance with the present invention, the principles of operation of the superconducting magnetic system is as follows.

Under normal duty conditions of the superconducting magnetic system (i.e., in the absence of normal zones), its elements are in the following state:

the control windings 11 (FIG. 1) of the shunts 4 of all previously disconnected sections 2 of the coil 1 are de-energized. Thus, the shunts 4 are in open (superconductive) state, and the disconnectors 3 are open (or have inserted a certain resistance, i.e., are in nonsuperconductive state). It is permissible for the disconnector 3 of the formerly disconnected section 2 to be in superconductive state;

the control windings 11 of the shunts 4 of the sections 2 of the coil 1 remaining in operating condition are energized. Thus, the shunts 4 are in closed (nonsuperconductive) state, and the disconnectors 3 of those sections 2 are open (i.e., in superconductive state);

the control winding 12 of the jumper 9 of the energy removal device 6 is energized, thus keeping the jumper 9 in closed (non-superconductive) state and, consequently, sharply increasing the resistance of the closed electric circuit 10. This allows to vary the output parameters of the patented superconducting magnetic system, say, to increase the magnetic field density.

It should be noted that the arrangement of the disconnectors inside the heat-insulated compartment 7 in compliance with the invention makes it allowable for them to have a certain resistivity (smaller than when the disconnector 3 receives a signal from the programmed control device 15) under normal duty conditions of the superconducting magnetic system.

On the occurence of a normal zone within the superconductor of any of the operative sections 2, the signal emitted by the normal zone detection unit 5 of the faulty section 2 is delivered to the programmed control device 15 that shapes the control signals and produces them in the following sequence:

first the signal de-energizing the control winding 12 of the jumper 9;

then the signal de-energizing the control winding of the shunt 4 of the disconnected section 2;

and finally the signal controlling the operation of the disconnector 3 of the disconnected section 2.

Said signal sequence provides for preparation of the energy removal device 6 and coil 1 for the beginning of the process of energy removal from the coil 1. This process starts when the control signal is delivered to the disconnector 3.

The control signal delivered to the disconnector 3 opens it (or inserts a resistance) and transfers the current from the disconnected section 2 to the shunt 4 connected in parallel to the section 2 and the disconnector 3. This is accompanied by a change in the magnetic flux shared in common by the coil 1 and the closed electric circuit 10 of the energy removal device 6, thus making it possible to transfer to the circuit 10 a considerable part of the energy due formerly to the participation of the disconnected section 2 in the operation of the coil 1. The low resistance of the closed electric circuit 10 brought about by de-energizing the control winding 12 of the jumper 9 allows the dissipate the energy transferred to the circuit 10 at a reasonable (from the point of view of the cooling conditions of the compartment 7) rate or, in other words, within the set period of time.

Part of the energy is dissipated within the disconnector 3 during the transfer of the current from the section 2 to the shunt 4.

The arrangement of the disconnector 3 and the closed electric circuit 10 inside the heat-insulated compartment 7 makes it possible to maintain the temperature of cooling of the coil 1 at the same level both at normal operation of the superconducting magnetic system and at the occurence of a normal zone. The control winding 11 and 12 ensure an improved efficiency of protection of the magnetic system irrespective of its parameters (magnetic field density).

Figure 4:
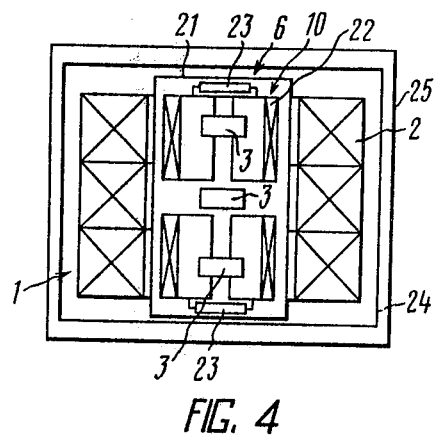
FIG. 4 shows another version of the general arrangement of the energy removal device and the superconducting sectionalized coil of the superconducting system, in accordance with the present invention.

The superconducting magnetic system shown in FIGS. 4 and 5 operates in the same way as the system shown in FIG. 1.

A distinguishing feature of the magnetic system of FIG. 5 is that the programmed control device 15 shapes the control signal delivered to the contact key 26. In this case, the sequence of the control signals is such that the first signal is delivered to the contact key 26, and then the other signals are sent in the order described above. The contact key that short-circuits the coil 1 during the period of removal of the energy (i.e., on the occurence of a normal zone) makes it possible to prevent the dissipation of energy within the source of supply 20 in the process of energy removal.

The dissipation of energy within the source of supply 20 at the instant of removal of the energy from the disconnected section 2 of the coil 1 is due to the inductive coupling between the disconnected section 2 and the remaining sections 2 of the coil 1. The short-circuiting of the coil 1 by the contact key 26 leads only to a rise in the current flowing through the coil 1. (In this case, the source of supply 20 is not connected any more to the coil 1 after the first failure, and the contact key remains closed, i.e., in a superconductive state).

Below are presented the constructional versions of embodiment of the superconducting magnetic system in accordance with the hereinproposed invention, wherein the superconducting sectionalized coil has nine sections and, correspondingly, a single closed electric circuit and two closed electric circuits. The numeral designations referred to in the following description of the versions are the same as in FIGS. 1, 2, 3, 4 and 5.

EXAMPLE 1.

The superconducting magnetic system in accordance with the hereinproposed invention comprises a superconducting sectionalized coil 1 (FIG. 1) each of the nine sections 2 of which is made of a superconducting material—niobium-titanium—and has a series-connected disconnector 3 of superconducting material—lead, each section 2 and its disconnector 3 being connected in parallel with a controlled shunt 4 of superconducting material—lead—and a normal zone detection unit 5 and coupled inductively with an energy removal device 6.

The energy removal device 6 comprises a compartment 7 provided with any suitable type of heat insulation and cooled with liquid helium. The compartment 7 contains a coil 8 made of a single turn of normal metal—copper—in the form of a cylinder placed coaxially on the coil 1 (FIG. 2) so as to embrace the latter and a jumper 9 (FIG. 1) of superconducting material—lead. The coil 8 and jumper 9 make up a closed electric circuit 10. The compartment 7 also contains the disconnectors 3.

The compartment 13 containing the coil 1 is cooled with liquid helium, and the porous heat insulation is impregnated with liquid helium. The liquid helium may flow between the compartments 7 and 13. The compartments 7 and 13 are arranged within a cryostat 14 provided with vacuum heat insulation and a nitrogen shield not shown in the drawing. A galvanic current-carrying lead is built in the cryostat 14 and the compartment 13 to bring in the current from the source of supply 20 and the coil 1.

Each controlled shunt 4 and jumper 9 is fitted with control winding 11 and 12, respectively, made of copper wire (the control windings 11 of the shunts 4 may be made of niobium-zirconium superconducting material), the winding of each shunt 4 being coupled electrically with the respective normal zone detection unit 5 and that of the jumper 9—with each normal zone detection unit 5. The control windings 11 and 12 are coupled electrically with the normal zone detection units 5 via a programmed control device 15. The latter comprises a logic unit 16 (FIG. 3) with its inputs connected to the outputs of the normal zone detection units 5. The output of the logic unit 16 is connected to the input of the control signal shaping unit 17. The output of the latter is, in turn, connected to the time delay unit 18, the outputs of which are connected correspondingly to the control windings 11 and 12 and the disconnectors 3.

The constructional version of embodiment of the magnetic system described above also has the disconnector 3 (FIG. 1) fitted with a copper-wire control winding (not shown in the drawing).

The superconducting magnetic system built in accordance with the present invention has the following parameters:

stored energy—4.5 Mj
inductance of a single section 2—0.2 H
inductance of remaining sections 2—7.6 H
mutual inductance of the disconnected section 2 and the remaining sections 2—0.68 H
inductance of the energy removal device 6—$2 \cdot 10^{-6}$ H
mutual inductance of the energy removal device 6 and the disconnected section 2—$0.4 \cdot 10^{-3}$ H
mutual inductance of the energy removal device 6 and the remaining sections 2—$2 \cdot 10^{-3}$ H
(the data applies to the worst case of occurence of a normal zone within the superconductor).

The resistance inserted by the disconnector 3 is 1 ohm. The resistance of the energy removal device 6 with the jumper 9 in superconductive state amounts to $0.5 \cdot 10^{-6}$ ohm. The loss of stored energy in the given version of disconnection of a single section 2 is equal to 10 percent.

Employment of the contact key 26 (FIG. 5) reduces the energy loss to 3 percent and increases the current in the coil 1 by 8 percent.

EXAMPLE 2.

The version of embodiment of the superconducting magnetic system depicted in FIG. 4 differs from that described in the above example 1 in that the heat-insulated compartment 21 cooled to cryogenic temperature is arranged inside the superconducting sectionalized coil 1 and cooled with slush hydrogen. The compartment 21 contains two coils 22 of normal metal—copper—made each of a single turn in the form of a cylinder placed coaxially inside the coil 1 and fitted respectively with jumpers 23 of superconducting material—niobium-tin. The coils 22 and jumpers 23 make up two closed electric circuits 10. The compartments 21 and 13 are heat insulated from each other by a vacuum gap (the cooling agents do not flow between the compartments 21 and 13).

Specific terms have been used in describing the versions of the embodiment of the hereinproposed invention to clarify an understanding of the superconducting magnetic system herein disclosed. The invention is, however, not limited to the adopted terms and it should be borne in mind that each term applies to all equivalent elements operating in a similar manner and employed for solving the same problems.

Although the invention has been described with a certain degree of particularity, it will be readily understood by those versed in the art that the present disclosure has been made only by way of example and that numerous changes in the details of construction and the combination and arrangement of parts may be resorted to without departing from the spirit and scope of the invention as hereinafter claimed.

What is claimed is:

1. A superconducting magnetic system comprising:
    a cryostat;
    a cooled compartment placed in said cryostat;
    a superconducting sectionalized coil arranged in said cooled compartment, each coil section having a series-connected disconnector, said coil section and series-connected disconnector being connected in parallel to a controlled shunt of superconducting material and a normal zone detection unit with an output, each said controlled shunt having an individual control winding linked electrically with the respective normal zone detection unit;
    an energy removal device linked inductively with each said section of said superconducting sectionalized coil, said energy removal device comprising a compartment cooled to cryogenic temperature, heat-insulated from above-said cooled compartment and arranged likewise inside, said cryostat containing said disconnector of each said section, and at least one coil of normal metal arranged within said cryogenically cooled compartment and having a jumper of superconducting material connected with said coil of normal metal so as to make up a closed electric circuit, said jumper having an individual control winding linked electrically with each said normal zone detection unit;
    current-carrying leads of said superconducting sectionalized coil;
    a source of supply connected to said current-carrying leads of said superconducting sectionalized coil.

2. A superconducting magnetic system according to claim 1 with a number of said sections of said sectionalized coil having series-connected disconnectors, said sections and series-connected disconnectors being connected in parallel to controlled shunts of superconducting material and normal zone detection units with outputs, said controlled shunts having individual control windings linked electrically with respective normal zone detection units, said energy removal device containing several said coils of normal metal with jumpers of superconducting material making up several closed electric circuits.

3. A superconducting magnetic system according to claim 1, wherein said cryogenically cooled compartment is arranged so as to embrace said superconducting sectionalized coil.

4. A superconducting magnetic system according to claim 1, wherein said cryogenically cooled compartment is arranged inside said superconducting sectionalized coil, and said jumper is made of a 2nd order superconductor.

5. A superconducting magnetic system according to claim 1, comprising a programmed control device with inputs equal in number to the number of said normal zone detection units and their outputs, each input being connected to said output of said normal zone detection unit of each said section, and with the outputs of said programmed control device connected to said control winding of each said shunt of each said section, said control winding of said jumper and said disconnector of each said section, respectively.

6. A superconducting magnetic system according to claim 2, wherein said cryogenically cooled compartment is arranged so as to embrace said superconducting sectionalized coil.

7. A superconducting magnetic system according to claim 2, wherein said cryogenically cooled compartment is arranged inside said superconducting sectionalized coil, and said jumpers are made of a 2nd order superconductor.

8. A superconducting magnetic system according to claim 2, comprising a programmed control device with several inputs and several outputs, the inputs being connected to said outputs of said normal zone detection units, and the outputs—to said control windings of said shunts, said control windings of said jumpers and said disconnectors.

* * * * *